UNITED STATES PATENT OFFICE.

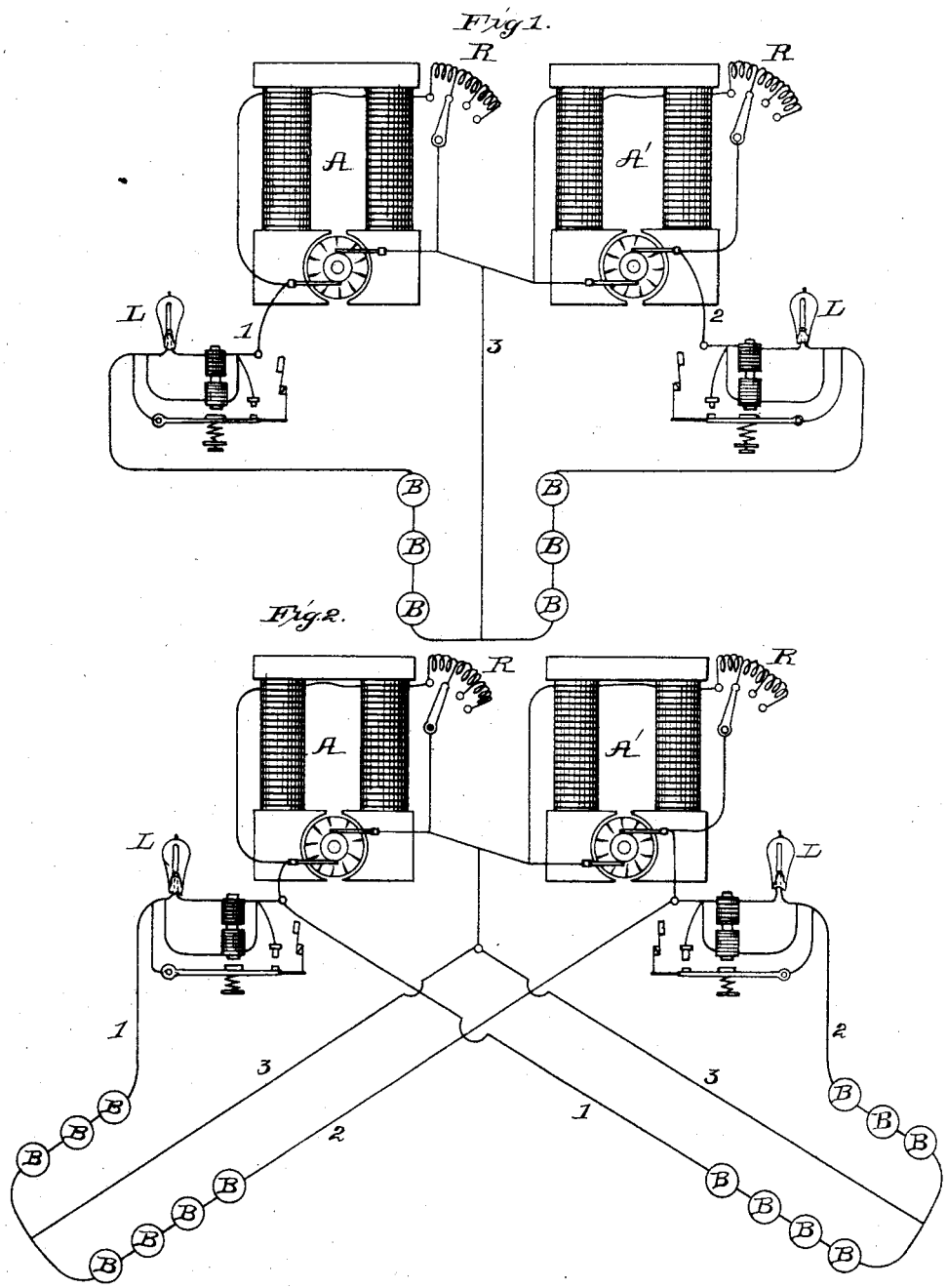

THOMAS A. EDISON, OF MENLO PARK, NEW JERSEY.

SYSTEM OF ELECTRIC LIGHTING.

SPECIFICATION forming part of Letters Patent No. 328,575, dated October 20, 1885.

Application filed October 2, 1884. Serial No. 144,546. (No model.)

*To all whom it may concern:*

Be it known that I, THOMAS A. EDISON, of Menlo Park, in the county of Middlesex and State of New Jersey, have invented a certain new and useful Improvement in Systems of Electrical Lighting, (Case No. 632,) of which the following is a specification.

The object I have in view is to combine in a series system of electric lighting by incandescence the advantage of small conductors resulting from the use of high-tension currents with an independence of circuits taken from a common source of supply. This I accomplish by using a divided source of electrical supply, such as two dynamo-electric machines having their armatures connected together in series. From this source of supply are taken three conductors, two conductors—the positive and negative—being taken from the outer terminals of the two machines, and the third conductor—the neutral or compensating conductor—from a point between the two machines. These three conductors are run out the desired distance, and are connected together at their outermost ends. The positive and negative conductors include each a number of incandescing electric lamps located in series with one another. These lamps are provided with cut-out mechanisms, which are not affected by changes in resistance of the incandescing conductor due to changes in temperature, but only act when the lamps break.

The two dynamo-electric machines are adapted to be regulated independently, each machine having its field-magnet coils located in a derived circuit from its armature, and in each field-circuit is located a manually or automatically adjusted resistance.

The three conductors form two circuits, which, while taken from a common source of electrical energy, are independent, in that the cutting out of a translating device on one side of the neutral or compensating conductor does not affect the translating devices on the other side, the central compensating-conductor becoming a positive or negative conductor if the current on one side or the other predominates, or becoming neutral if the two sides balance. When two or more of such compound circuits (each composed of two independent circuits) are taken from the same source of electrical supply, as I design to do, the relative resistances of the several compound circuits may be maintained constant by adjustable resistances, or otherwise, as explained in two applications of even date herewith, Nos. 144,544 and 144,545.

In the accompanying drawings, forming a part hereof, Figure 1 is a view, principally diagrammatic, illustrating a system having one compound circuit; and Fig. 2, a similar view showing two compound circuits taken from a common source of supply.

A A' are dynamo-electric machines having their armatures connected in series. Each machine has its field-magnet coils in a circuit derived from its armature, and adjustable resistance R is located in each field-circuit to regulate the machines independently.

1 and 2 are positive and negative conductors, and 3 the neutral or compensating conductor. These three conductors form a compound circuit, in each side of which are arranged in series a number of incandescing electric lamps, L B.

Each lamp has an automatic cut-out mechanism for closing a shunt around the lamp when its carbon conductor is broken, and not until then. As described fully in the applications referred to, this cut-out acts only when the lamp-carbon breaks, and is not affected by changes in resistance of the incandescing conductor due to changes in its temperature.

The circles B represent lamps with cut-outs, one lamp only being developed in each circuit. In Fig. 2 two of such compound circuits are shown as taken from the same source of supply.

What I claim is—

1. The combination, with a divided source of electrical energy, of a compound or three-wire circuit extending therefrom, incandescing electric lamps located in series in each side of the circuit, and cut-out mechanisms for the separate lamps, substantially as set forth.

2. The combination, with a divided source of electrical energy, the parts of which are independently regulatable, of a compound or three-wire circuit extending therefrom, incandescing electric lamps located in series in each side of the circuit, and cut-out mechanisms for the separate lamps, substantially as set forth.

3. The combination, with a divided source of electrical energy, of two or more compound or three-wire circuits taken therefrom, incandescing electric lamps located in series in each side of said compound circuits, and cut-out mechanisms for the separate lamps, substantially as set forth.

This specification signed and witnessed this 12th day of September, 1884.

THOS. A. EDISON.

Witnesses:
WM. H. MEADOWCROFT,
PAUL D. DYER.